United States Patent
Verret

(10) Patent No.: US 11,676,374 B1
(45) Date of Patent: Jun. 13, 2023

(54) THREE-DIMENSIONAL-ENABLED TARGETING OF IMAGERY WITH RIGOROUS ERROR PROPAGATION

(71) Applicant: Raytheon Company, Waltham, MA (US)

(72) Inventor: Jody D. Verret, Rockwall, TX (US)

(73) Assignee: Raytheon Company, Waltham, MA (US)

(*) Notice: Subject to any disclaimer, the term of this patent is extended or adjusted under 35 U.S.C. 154(b) by 114 days.

(21) Appl. No.: 17/231,885

(22) Filed: Apr. 15, 2021

Related U.S. Application Data

(60) Provisional application No. 63/011,496, filed on Apr. 17, 2020.

(51) Int. Cl.
  *G06V 10/98* (2022.01)
  *G06T 7/32* (2017.01)
  *G06T 7/38* (2017.01)
  *G06V 20/64* (2022.01)
  *G06V 20/10* (2022.01)

(52) U.S. Cl.
  CPC .......... *G06V 10/98* (2022.01); *G06T 7/32* (2017.01); *G06T 7/38* (2017.01); *G06V 20/176* (2022.01); *G06V 20/64* (2022.01); *G06T 2207/10028* (2013.01)

(58) Field of Classification Search
  None
  See application file for complete search history.

(56) References Cited

U.S. PATENT DOCUMENTS

| | | | |
|---|---|---|---|
| 8,855,442 B2 | 10/2014 | Owechko | |
| 9,269,145 B2 | 2/2016 | Ely et al. | |
| 9,275,267 B2 | 3/2016 | Verret | |
| 9,471,986 B2 | 10/2016 | Janky | |
| 9,996,976 B2* | 6/2018 | Zhou | G06T 7/344 |
| 10,311,633 B2 | 6/2019 | Roimela | |
| 2011/0110557 A1 | 5/2011 | Clark et al. | |
| 2019/0258899 A1* | 8/2019 | Coogan | G06V 20/188 |

(Continued)

FOREIGN PATENT DOCUMENTS

| | | | | |
|---|---|---|---|---|
| AU | 2014254426 B2 * | 5/2018 | | G06K 9/00476 |
| EP | 2963450 A1 * | 1/2016 | | G01C 21/20 |
| WO | WO-2021067252 A1 | 4/2021 | | |

OTHER PUBLICATIONS

"U.S. Appl. No. 17/020,300, Non Final Office Action dated Mar. 17, 2022", 8 pgs.

(Continued)

*Primary Examiner* — Emily C Terrell
*Assistant Examiner* — Nathan J Bloom
(74) *Attorney, Agent, or Firm* — Schwegman Lundberg & Woessner, P.A.

(57) ABSTRACT

A system first registers a two-dimensional image to targetable three-dimensional data. A user or automated process selects image coordinates of a target within the registered two-dimensional image. The system intersects the image coordinates of the target with the targetable three-dimensional data, thereby generating geodetic coordinates of the target in a point cloud. Error estimates for the geodetic coordinates of the target are generated, and the system stores the geodetic coordinates and associated error of the target in a database for use in downstream exploitation.

18 Claims, 9 Drawing Sheets

(56) References Cited

U.S. PATENT DOCUMENTS

2020/0312008 A1   10/2020  Cowburn et al.
2021/0097280 A1    4/2021  Sharp, III et al.

OTHER PUBLICATIONS

"U.S. Appl. No. 17/020,300, Response filed Jun. 17, 2022 to Non Final Office Action dated Mar. 17, 2022", 7 pgs.
"International Application Serial No. PCT/US2020/053240, International Preliminary Report on Patentability dated Apr. 14, 2022", 7 pgs.
U.S. Appl. No. 17/020,300, filed Sep. 14, 2020, Image Targeting via Targetable 3D Data.
"International Application Serial No. PCT/US2020/053240, International Search Report dated Dec. 14, 2020", 3 pgs.
"International Application Serial No. PCT/US2020/053240, Written Opinion dated Dec. 14, 2020", 5 pgs.
Chao-Jung, Liu, et al., "3D point cloud segmentation using GIS", Proceedings of the 20th Irish Machine Vision and Image Processing Conference, (Aug. 29, 2018), 41-48.
Krylov, Vladimir, et al., "Object Geolocation Using MRF Based Multi-Sensor Fusion", 25th IEEE International Conference On Image Processing, (Oct. 7, 2018), 2745-2749.
"U.S. Appl. No. 17/020,300, Notice of Allowability dated Oct. 5, 2022", 2 pgs.
"U.S. Appl. No. 17/020,300, Notice of Allowance dated Sep. 20, 2022", 9 pgs.

\* cited by examiner

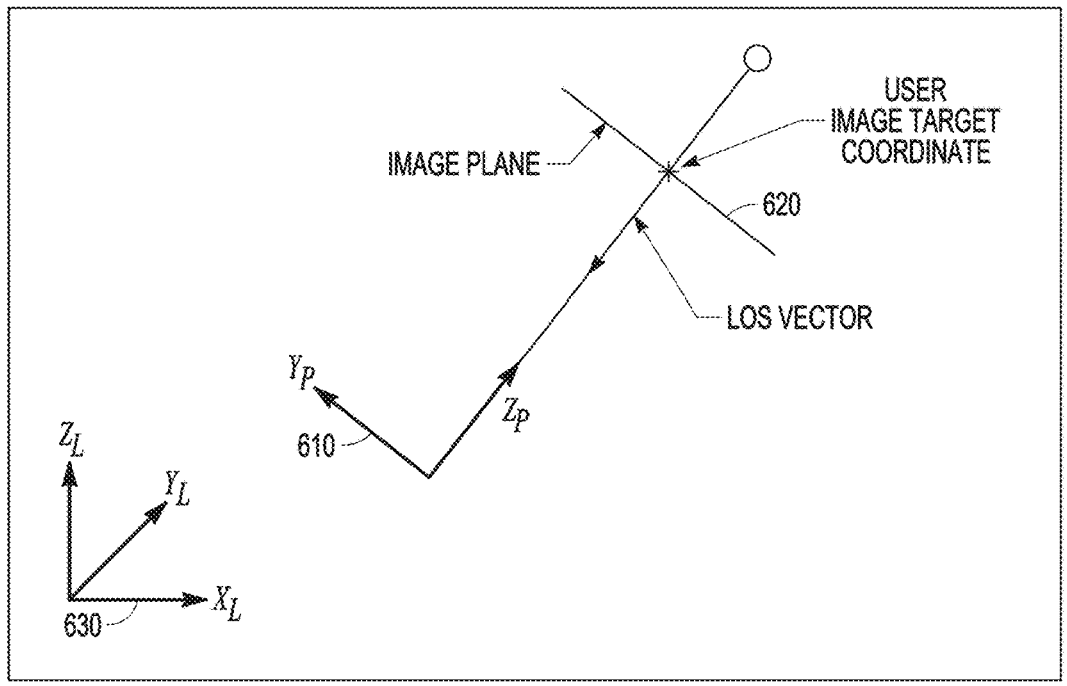
FIG. 6A
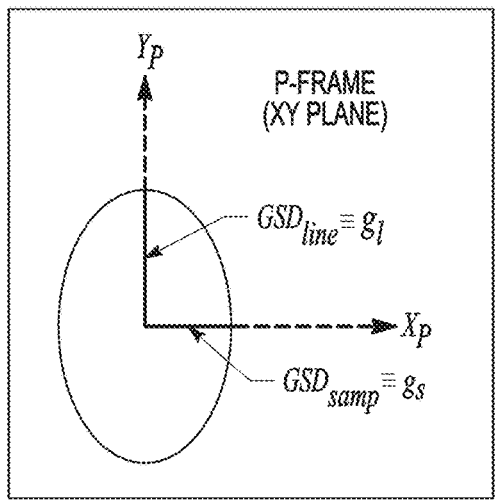
FIG. 6B
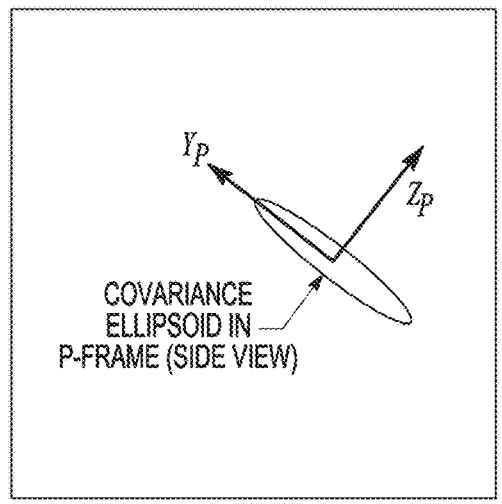
FIG. 6C
$$C_{user}^{P} = \begin{bmatrix} (R_{user} g_s)^2 & 0 & 0 \\ 0 & (R_{user} g_l)^2 & 0 \\ 0 & 0 & \sigma_z^2 \end{bmatrix}$$
$\sigma_z$ = "small"
FIG. 6D

THREE-DIMENSIONAL-ENABLED TARGETING OF IMAGERY WITH RIGOROUS ERROR PROPAGATION

RELATED APPLICATIONS

This application is related and claims priority to U.S. Application No. 62/908,397, filed on Sep. 30, 2019, the contents of which are incorporated by reference.

This application is further related and claims priority to U.S. Application No. 63/011,496, the contents of which are incorporated by reference.

TECHNICAL FIELD

Embodiments described herein generally relate to three-dimensional-enabled targeting of imagery.

BACKGROUND

Foundational, targetable three-dimensional geospatial intelligence (GEOINT) data may exist in a database repository. This GEOINT data can be used in industry to geospatially locate objects such as buildings or vehicles. These data can also be used by the military to geospatially locate targets. However, the GEOINT data may be dated and not as current as a new intelligence or other two-dimensional image. Furthermore, persons who need to target such objects may not have the bandwidth, time, or expertise to download and exploit the three-dimensional data themselves.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 3A, 38, and 3C are another illustration of ray intersection of a two-dimensional image location to a targetable three-dimensional data set, such as a set of three-dimensional geospatial intelligence (GEOINT) data, to obtain a three-dimensional target location.

FIGS. 6A, 6B, 6C, and 6D illustrate a process to determine a user mensuration error.

DETAILED DESCRIPTION

One or more embodiments are directed to being able to point to a location in a two-dimensional image, and then being able to determine corresponding three-dimensional coordinates for that location in the two-dimensional image using a targetable three-dimensional data set, such as a set of three-dimensional geospatial intelligence (GEOINT) data. If the three-dimensional GEOINT data are certified for targeting, the three-dimensional GEOINT data have highly accurate geolocation information. For example, referring to FIG. 1, a new two-dimensional intelligence image 110 is received. The two-dimensional image has a specific target of interest, for example, a structure 115. However, that target of interest may not be in the three-dimensional GEOINT data 120. To address this situation, in an embodiment, a user can select (e.g., via a user interface) the target within the image, and if the image is registered to the three-dimensional GEOINT data, a ray can be projected from the two-dimensional image to the three-dimensional data, and this provides a three-dimensional coordinate (130). The registering also addresses some error associated with the two-dimensional image. This is accomplished by using software tools for rendering the three-dimensional GEOINT data and coupling that with the image sensor that captured the two-dimensional image.

Figure 1:
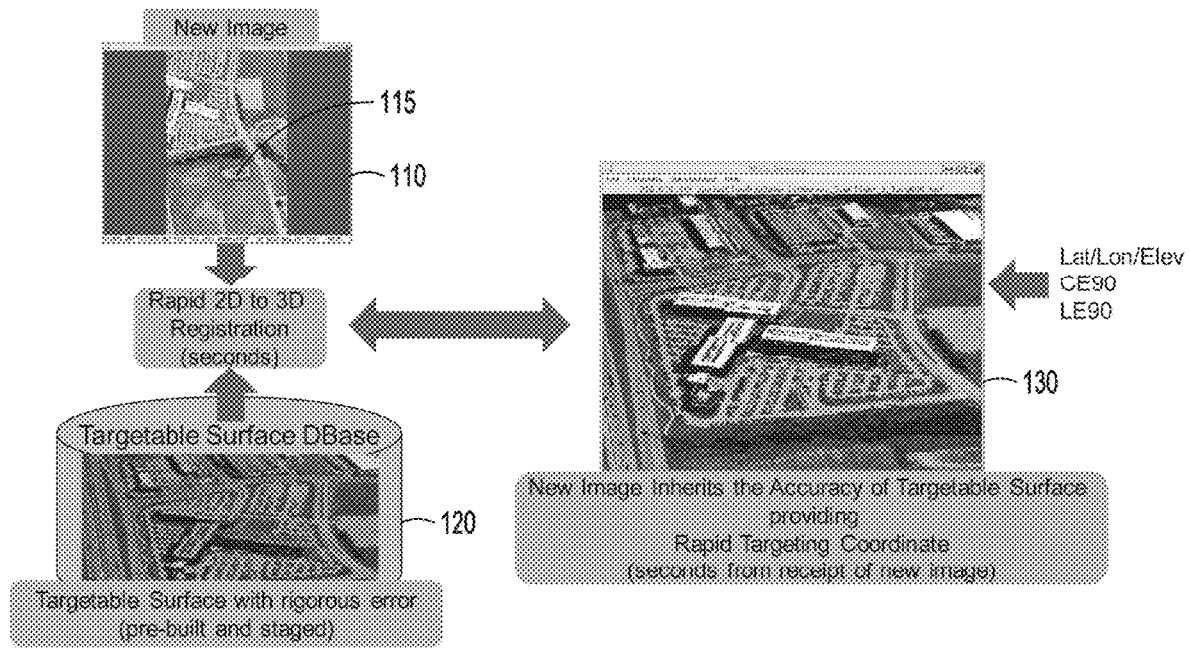
FIG. 1 is an illustration of a two-dimensional image and a targetable three-dimensional data set, such as a set of three-dimensional geospatial intelligence (GEOINT) data.
Figure 1A:
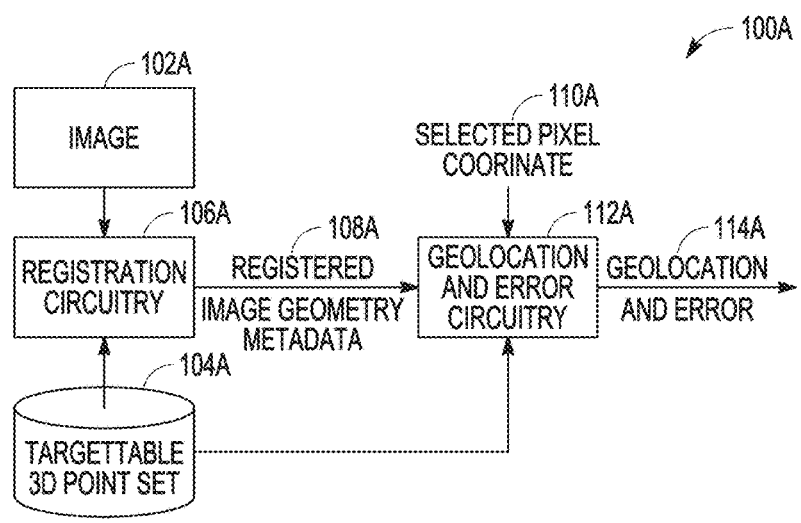
FIG. 1A is a block diagram of a process of registering a two-dimensional image to a targetable three-dimensional data set, such as a set of three-dimensional geospatial intelligence (GEOINT) data.

An embodiment is further illustrated in FIG. 1A, which is a diagram of a system 100A for geolocation determination and provision. The system 100A as illustrated includes an image 102A and a targetable 3D point set 104A. The image 102A can be of a geographical region that is a subset of a geographical region spanned by the targetable 3D point set 104A. The image 102A can be from an image sensor. The image sensor can include a synthetic aperture radar (SAR), electro-optical (EC), multi-spectral imagery (MSI), panchromatic, infrared (IR), nighttime EO, visible, nighttime visible, or other image sensor, The targetable 3D point set 104A can include data indicating latitude, longitude, and elevation of specific locations in space. The targetable 3D point set 104A can include a digital elevation map (DEM) that includes regularly spaced points, a passive, photogrammetrically derived 3D (P3D) point set or other 3D point set that includes irregularly spaced points, In some embodiments, the targetable 3D point set 104A further includes intensity data for each point. The intensity data can be derived from imagery of the geographical region.

The system 100A includes registration circuitry 106A that registers the image 102A to the points in the targetable 3D point set 104A. The registration circuitry 106A can alter the geometry of the image 102A to make respective pixels of the image 102A align with respective points of the targetable 3D point set 104A at a same geographic location with a specified error. There are multiple ways to register the image 102A to the targetable 3D point set 104A. The technique used to register the image 102A to the targetable 3D point set 104A can be dependent on the data available with the targetable 3D point set 104A, the type of sensor used to generate the image 102A, a registration accuracy required, or the like. The targetable 3D point set 104A can represent a physical surface, such as a surface of the earth or other planetary bodies. The registered 3D data set can have associated metadata that includes error estimates of absolute geolocation for every point in the 3D data set.

The registration circuitry 106A or other circuitry herein can include electric or electronic components configured to perform operations thereof. Electric or electronic components can include one or more processing units, such as a central processing units (CPUs), application specific integrated circuits (ASICs), field programmable gate array (FPGA), graphics processing unit (GPU), or the like. The electric or electronic components can additionally or alternatively include one or more resistors, transistors, inductors, capacitors, diodes, logic gates (e.g., AND, OR, XOR, negate, buffer, or the like), switches, multiplexers, power supplies, digital to analog converter (DAC), analog to digital converter (ADC), rectifiers, amplifiers, modulators, demodulators, or the like, situated in a circuit to perform the operations thereof. In some embodiments, the operations can be performed by software executing on the circuitry.

The registration circuitry 106A can generate an image that is registered to the targetable 3D point set 104A, called a registered image (the image 102A with registered image geometry metadata 108A). The registration process performed by the registration circuitry 106A includes a known error, per pixel, that can be recorded.

The system 100A further includes geolocation and error circuitry 112A. The geolocation and error circuitry 112A can receive the registered image geometry metadata 108A, a subset of the targetable 3D point set 104A corresponding to the geolocation of the image 102A (same or different from the subset used by the registration circuitry 106A to register the image 102A to the targetable 3D point set 104A), and an indication of pixel image coordinates 110A within image 102A selected by a user or other automated process. The image 102A and registered image geometry metadata 108A can be presented to a user on a display. The user can select pixel image coordinates 110A and the geolocation and error circuitry 112A can return a geolocation and error 114A corresponding to the selected pixel image coordinates 110A. The pixel image coordinates 110A can be chosen from the image 102A. The registered image geometry metadata 108A includes the pixel data from the image 102A and the corrected image geometry metadata from the registration process. The error of the geolocation in 114A can indicate the geolocation accuracy of the corresponding geolocation.

It is noted in connection with FIGS. 1 and 1A that there exist commercially available tools for exploitation of three-dimensional data. However, the tools do not have an image registration feature. Some features of certain embodiments are directed to finding a location in the three-dimensional GEOINT data (point cloud). In accordance with some aspects, the actual image is not transported into the point cloud, but the points are simply exploited. That is, the image gets registered to the point cloud.

Other tools such as described above relate to bringing up a point cloud, traversing through the point cloud, and then selecting a three-dimensional location in the point cloud. The tools do not generally solve the problem of having an intelligence image with a new target in it that does not exist in the GEOINT data. Unlike preexisting tools, the methods and apparatuses described herein use, in some embodiments, a rigorous error determination in connection with determining the three-dimensional location in the GEOINT data. A user who selects a target not only needs to know what is being targeted, but the user also needs to know the accuracy of the targeting process, which the above-mentioned tool cannot provide.

The projection of the previously-mentioned ray from the two-dimensional image to the three-dimensional data involves ray intersections of the two-dimensional image coordinates (e.g., of an intelligence image) with registered, targetable three-dimensional data, such as three-dimensional GEOINT data. The intersected location in the three-dimensional GEOINT data is the location of the target that was selected in the two-dimensional image. The results are the GEOINT data coordinates—latitude, longitude, and elevation. The two-dimensional image may include a fleeting target (e.g., a parked vehicle on a road) that is not present in the foundation 3D GEOINT data. The ray intersection allows for determining a three-dimensional location that is associated with the fleeting target or the new feature or object in the image.

In addition to coordinating transfer between the two-dimensional image and the three-dimensional GEOINT data, an embodiment also models multiple error sources, which can be referred to as error propagation. These multiple error sources can relate to (a) the registration process, (b) a user's ability to point to the target in the image, (c) a point transfer algorithm that accommodates a resolution (i.e., point spacing) of the three-dimensional data, (d) the predicted error in the three-dimensional data target point, and (e) a transfer of other photogrammetric image measurement errors. As noted, the correct and reliable modeling of all error sources can be important in targeting applications since the user who identifies and selects the target needs to know not only the target geolocation, but also the error associated with the geolocation coordinates. Additionally, CE90 circular error and LE90 linear error are determined.

Referring again to FIG. 1, a synthetic image 130 is formed by projecting the point cloud of the three-dimensional GEOINT data 120 to the geometry of the two-dimensional (intelligence) image 110. Correlation processing is run between the synthetic image 130 and the real image 110. Since the three-dimensional coordinates are known in the synthetic image, the three-dimensional coordinates can serve as "ground control points" (GCPs), and the image coordinates can be observations for a GCP bundle adjustment (photogrammetric resection). The result is a corrected geometry for the two-dimensional image consistent with the GCP coordinates, and the image geometry is thus registered to the point cloud. The new two-dimensional image 110 inherits the accuracy of the targetable surface of the three-dimensional GEOINT data 120 because the two-dimensional image 110 is registered to the GEOINT data 120 via the synthetic image 130.

Figure 2A:
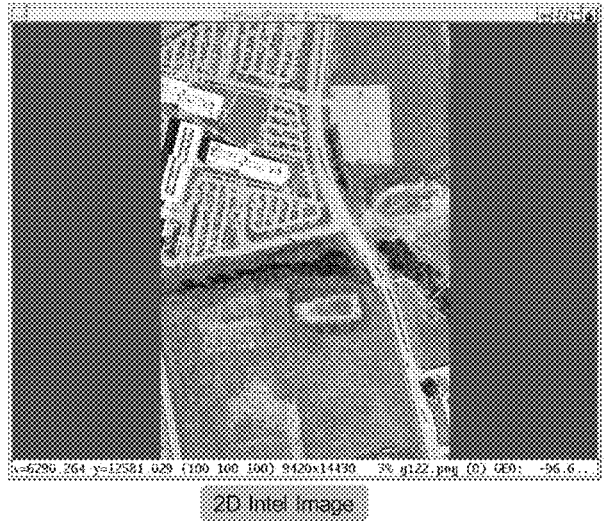
FIGS. 2A and 2B are another illustration of a registration of a two-dimensional image to a targetable three-dimensional data set, such as a set of three-dimensional geospatial intelligence (GEOINT) data.
Figure 2B:
Figure 3A:
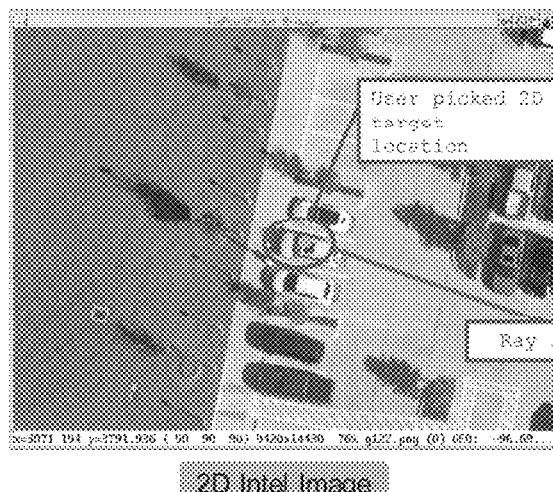
Figure 3B:
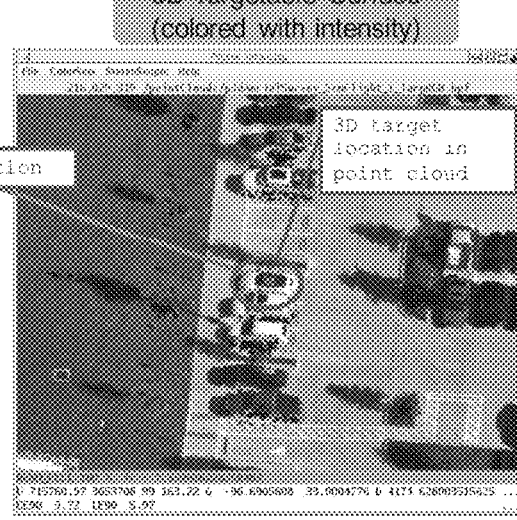
Figure 3C:

FIGS. 2A, 2B, 3A, 3B, and 3C illustrate a screen shot of an embodiment. FIGS. 2A, 3A illustrate a two-dimensional image, and FIGS. 2B, 3B illustrates a point cloud. FIGS. 2A, 3A are overview screenshots and FIGS. 3A, 3B, and 3C illustrate a "zoomed" version. The point cloud view in FIGS. 2B, 3B permits a user to rotate the three-dimensional GEOINT data. As noted, a user selects a target location in the FIGS. 2A, 3A two-dimensional image, and after selecting the two-dimensional location, as discussed in more detail herein, a ray intersection is executed to generate the three-dimensional GEOINT coordinates.

Figure 4:
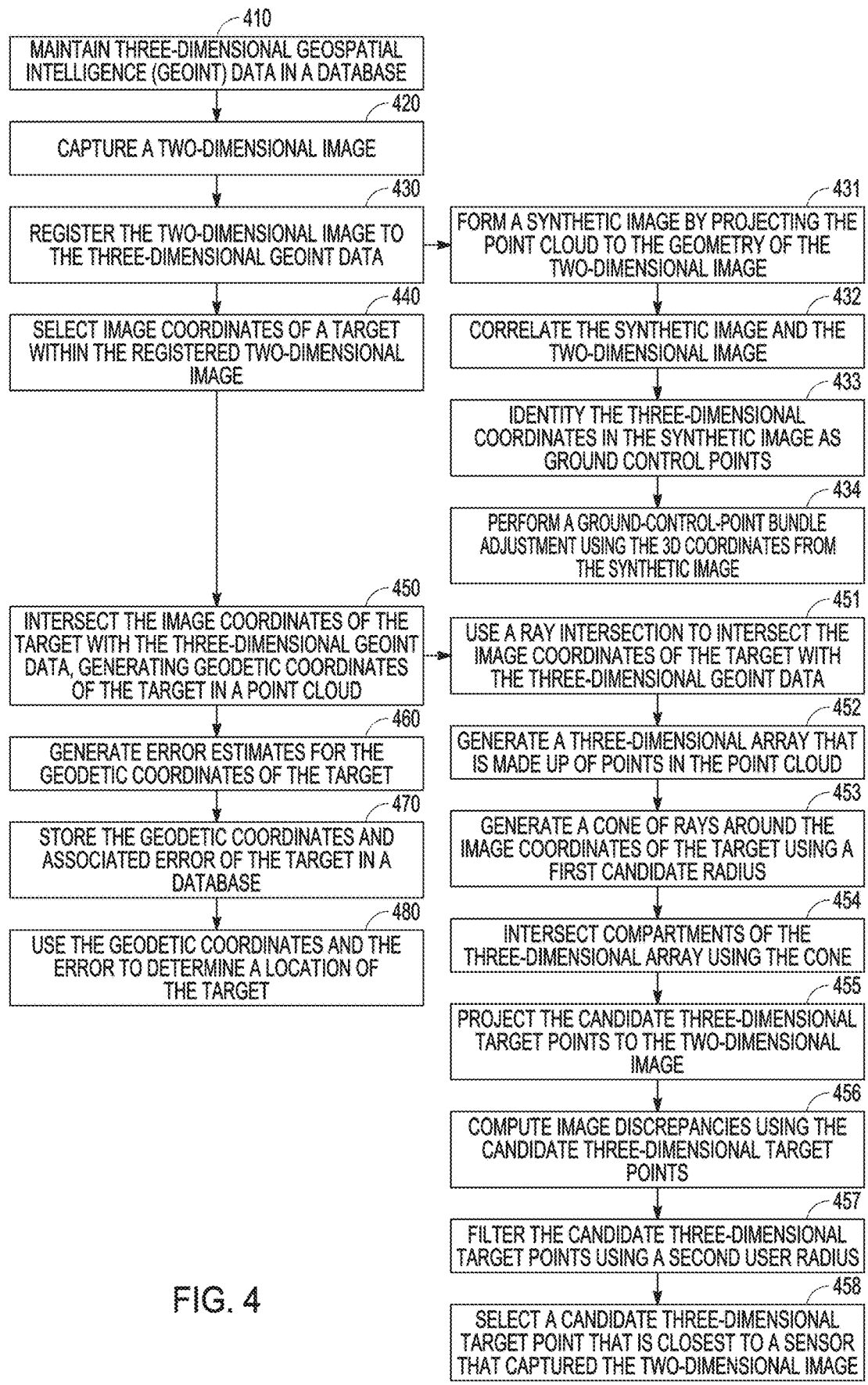
FIG. 4 is a diagram illustrating a process to register a two-dimensional image using a targetable three-dimensional data set, such as a set of three-dimensional GEOINT data.

FIG. 4 is a diagram illustrating a process to register a two-dimensional image using a targetable three-dimensional data set, such as a set of three-dimensional GEOINT data. FIG. 4 includes process blocks 410-480. Though arranged substantially serially in the examples of FIG. 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations. Additionally, any embodiments of such a process to register a two-dimensional image using a targetable three-dimensional data set can includes process steps that are ground-based (such as on a server, laptop computer, pad device, cellular phone, or other personal computing device), or air-based (such as in a manned or unmanned aircraft), or a combination of ground-based and air-based process steps.

Referring now to FIG. 4, at 410, a targetable three-dimensional data set, such as a set of three-dimensional geospatial intelligence (GEOINT) data, is maintained in a computer database, and at 420, a two-dimensional image is received and/or captured by an image sensor. This two-dimensional image can be an intelligence image. The targetable three-dimensional data set can be a local database, or it can be a remote database whose data are transmitted over a network. Similarly, the image sensor can be local in nature, or it can be remote whose image data are received over a network. At 430, the two-dimensional image is registered to the three-dimensional GEOINT data. At 440, image coordinates of a target are selected within the registered two-dimensional image. In an embodiment, this can be done by a user simply clicking on the target in the two-dimensional image. In another embodiment, the image coordinates may be automatically determined by Machine Learning or Automatic Target Recognition algorithms. At 450, the image coordinates of the target are intersected with the three-dimensional GEOINT data. The intersecting process generates geodetic coordinates of the target in a point cloud. At 460, error estimates for the geodetic coordinates of the target are generated. At 470, the geodetic coordinates and associated error of the target are stored in a database. As indicated at 480, these geodetic coordinates and the error can be used to determine a location of the target. The target location can be used for military, commercial, and/or industrial purposes.

The registration 430 of the two-dimensional image to the three-dimensional GEOINT data is executed as follows. At 431, a synthetic image is formed by projecting the point cloud to the geometry of the two-dimensional image. At 432, the synthetic image and the two-dimensional image are then correlated. At 433, three-dimensional coordinates in the synthetic image are identified as ground control points. At 434, observations for a ground-control-points bundle adjustment (photogrammetric resection) are identified using the three-dimensional coordinates in the synthetic image. The ground-control-points bundle adjustment generates a corrected geometry for the two-dimensional image and registers the two-dimensional image to the 3D GEOINT data.

Operation 450, the intersecting of the two-dimensional image coordinates of the target with the three-dimensional GEOINT data can be a ray intersection technique (451), and it can be executed as follows. At 452, a three-dimensional array that is made up of points in the point cloud is generated. The contents of each 3D array cell are a list of indexes into the point cloud that fall within the cell. At 453, a cone of rays is generated around the image coordinates of the target. This cone of rays has a first candidate radius. It is noted that the cone of rays need not be cone-shaped, but the rays can form other shapes as well. At 454, compartments of the three-dimensional array are intersected using the cone. The intersection of the compartments determines candidate three-dimensional target points. At 455, the candidate three-dimensional target points are projected to the two-dimensional image. At 456, image discrepancies are computed using the candidate three-dimensional target points. At 457, the candidate three-dimensional target points are filtered using a second user radius. Finally, at 458, a candidate three-dimensional target point is selected that is closest to a sensor that captured the two-dimensional image.

Figure 5A:
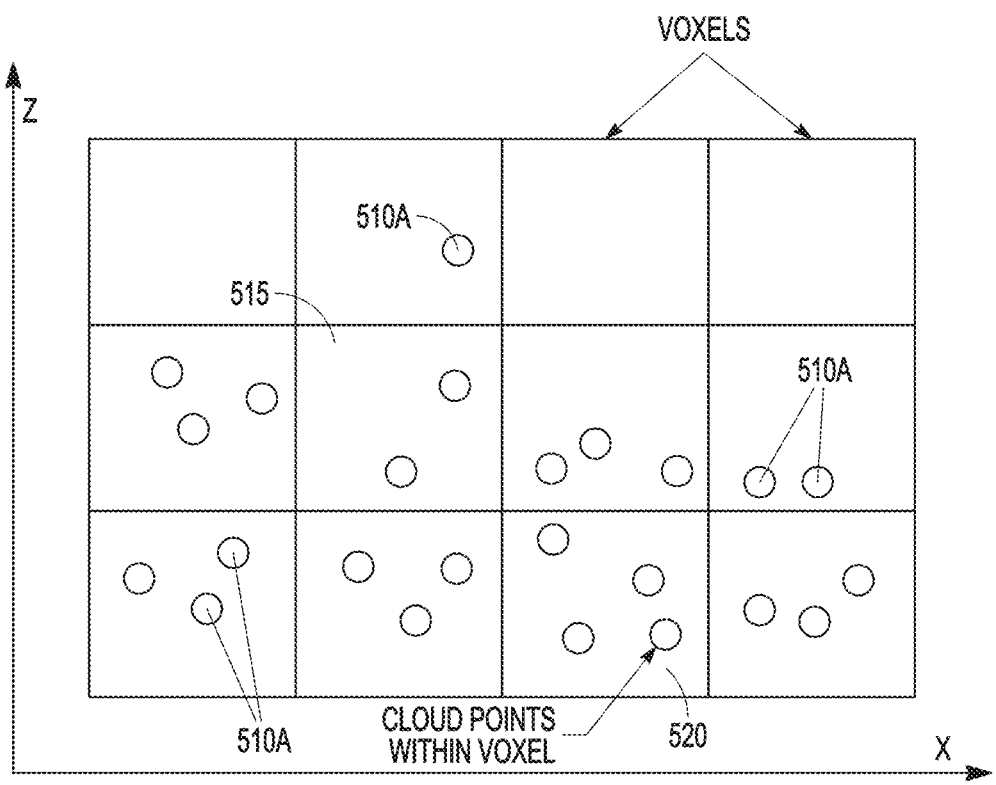
FIGS. 5A, 5B, and 5C illustrate a process of intersecting the image coordinates of a target in a two-dimensional image with the targetable three-dimensional data set, such as a set of three-dimensional GEOINT data, using a voxel array.
Figure 5B:
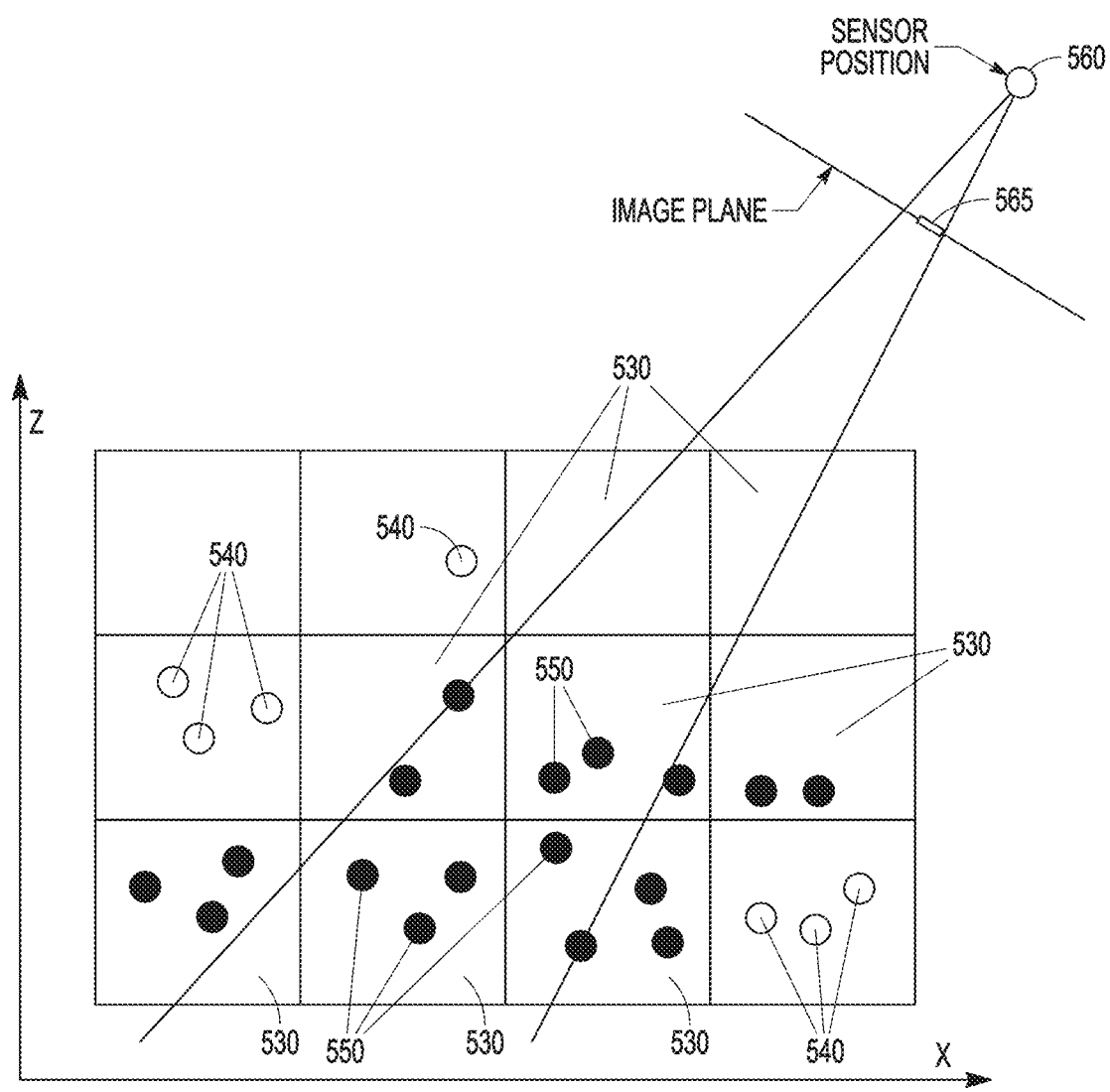
Figure 5C:
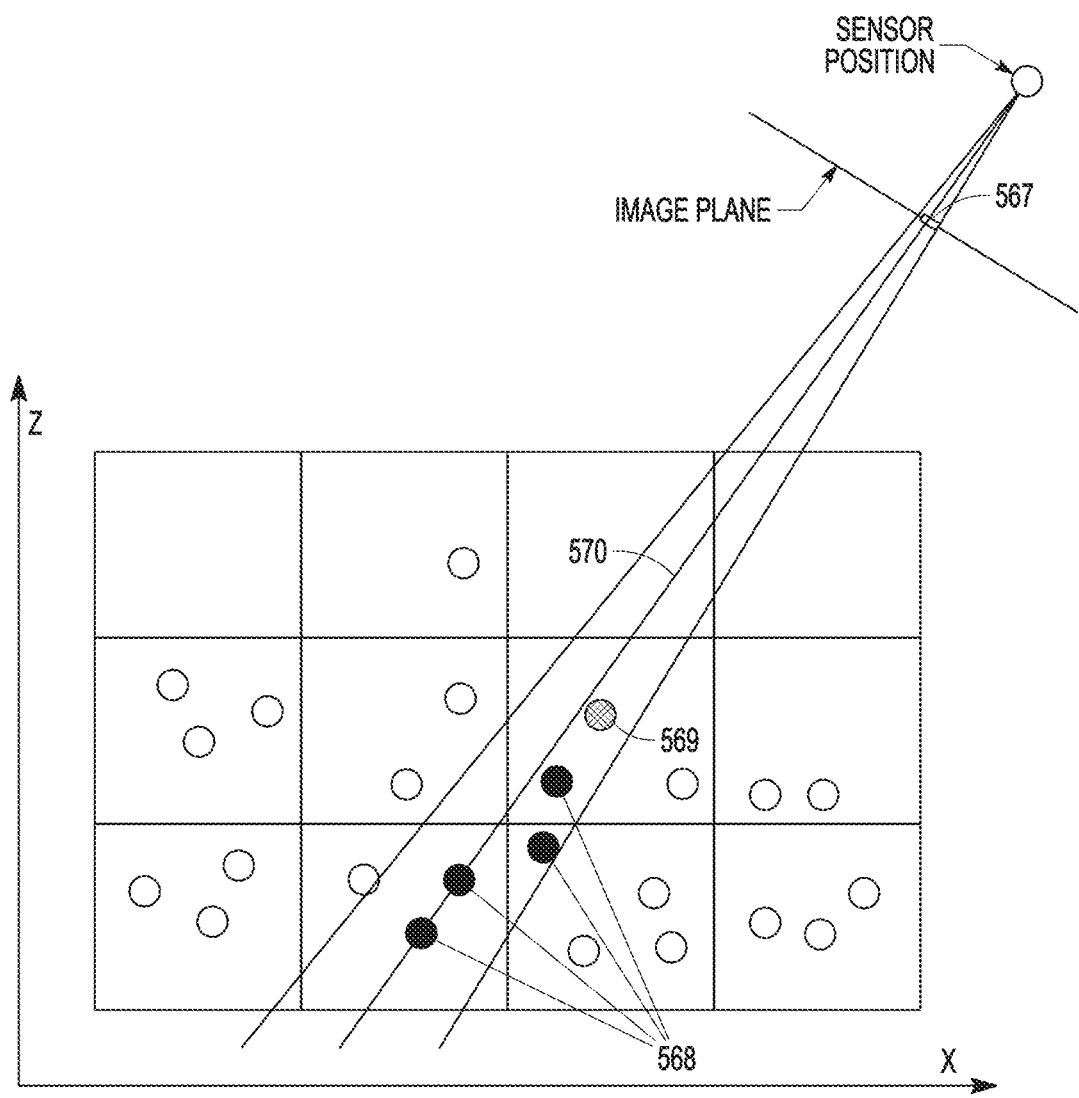

The process of the intersecting of the two-dimensional image coordinates of the target with the three-dimensional GEOINT data is further illustrated in FIGS. 5A, 5B, and 5C. More specifically, FIGS. 5A, 5B, and 5C illustrate, by way of example, respective conceptual block diagrams of an embodiment of a technique for selecting a point in the targetable three-dimensional data point set 104A that is associated with user-selected pixel image coordinates 110A. While FIGS. 5A, 5B, and 5C are two-dimensional in nature, it is noted that the intersection process uses a three-dimensional array.

Before referring specifically to FIGS. 54, 5B, and 5C, in an embodiment, the manner in which a target is transferred from the two-dimensional image to the three-dimensional GEOINT data is that the point cloud is voxelized, which means breaking the point cloud into a three-dimensional array. The array includes the cloud points via a list of indexes into the data for each array cell (voxel). The three-dimensional array permits a fast look up of the points. A cone of rays is constructed from the user-selected location in the two-dimensional image. The cone of rays is constructed with a specific image radius ($R_{cand}$) about the user-selected image coordinate. The radius projects down into the cone. The cone is then intersected with the voxels to determine the three-dimensional candidate locations of the points. The candidate points are then projected back to the image. Each one of those 3D candidate points, when it gets projected back to the image, produces an image coordinate. This process involves a discrepancy, which is the image distance between a user-selected point in an image and the back-projected candidate's 3D point. Those that pass with discrepancies less than user mensuration radius ($R_{user}$) are considered further refined intersection points. In the refinement process, the 3D coordinate closest to the sensor is selected as the "winning" 3D target location. For example, if the two-dimensional image is that of the roof of a building, and a point on the floor of the building has the smaller discrepancy, the point on the floor will not be selected because the point on the floor cannot be seen by the image sensor. Rather, the point on the roof, that is, the point closer to the image sensor, is selected as the true 3D target location.

Referring now specifically to FIG. 5A, FIG. 5A illustrates, in a two-dimensional manner, a voxelization of the point cloud. A voxel refers to a volumetric element (or cell) in the 3D array. The points 510A are the points in the point cloud. For each one of the points in the voxels, a set of indices is stored into the original point cloud data. For example, the voxel 515 contains two indices. The points are numbered one, two, three, four, etc. within a point cloud, and the indices are stored in each of the boxes in FIG. 5A. For example, the box 520 has four indexes. A lookup of these points is done through these indices. The queries that determine which points are in which boxes are fast because the algorithm just needs to figure out what box is the current box, which current box has a list of point indices, and then from that list of indexes the associated x, y, z values can he determined.

Referring now to both FIGS. 1A and 5A, the data set that is "voxelized" is the targetable 3D point set 104A in FIG. 1A. As noted above, voxelizing includes generating a set of point indexes for each voxel. Each voxel can represent a 3D space about the surface of the earth or other 3D surface. The voxels are arranged in a 3D volume that constitute a notional 3D space. The indexes for a voxel indicate the 3D points in the targetable 3D point set 104A that fall within the space represented by the voxel. In the 2D voxel representation provided in FIG. 5A, the voxel 520 includes indexes of four 3D points of the targetable 3D point set 104A. Voxelizing the 3D point set can occur in advance or at runtime.

Referring now to FIG. 5B, a sensor position for a user-selected image coordinate is approximated via image geometry metadata. The cone of rays of the radius $R_{cand}$ is constructed centered at user-selected image coordinates. The rays are intersected with voxels, and candidate target points are indexes within intersected voxels. The candidate target point determination is based on a candidate radius. At the image plane of the sensor, at the center of that image plane, is the user-selected location. There is a radius about the center of the image plane in pixel units, and then a cone of rays constructed based on that radius. The candidate points for further consideration are the ones that the cone intersects in voxel space. Those are the boxes 530. For example, points 540 are excluded as being the true target location because those points are within voxels that do not intersect, the cone. The points 550 in the shaded regions 530 are candidate points for the next phase of the algorithm, which is illustrated in FIG. 5C.

More specifically, referring still to FIG. 5B, candidate voxels are identified based on a position and orientation (relative to the targetable 3D point set 104A) of an image sensor 560.

The position and orientation of the image sensor 560 can be determined based on registered image geometry metadata 108A. Each of the voxels that is intersected by a search region (e.g., area or volume, such as a cone with a radius, $R_{CAND}$) at an image plane can be identified. $R_{CAND}$ 565 is the distance from the selected pixel coordinate 110A to an edge of the cone in the example of FIG. 5B. The search region in the example of FIG. 5B is a cone in 3D associated with the search $R_{CAND}$. Note that the illustrated cone of FIG. 5B is merely an example of a search region and search regions of other areas or volumes are within the scope of this application. Examples of other search region areas or volumes include a pyramid, cylinder, frustrum, 3D parallelogram, a 3D polygon or 3D version thereof, an irregular volume, or the like. Each of the intersected voxels can be recorded as potentially including the 3D point corresponding to the geolocation selected by the user. For each of the intersected voxels, the indexes of 3D points in the voxels can be retrieved. In some embodiments, the associated 3D point set data indicated by the indexes can be retrieved.

The sensor position for a user-selected image coordinate can be determined via registered image geometry metadata 108A. The cone of rays extending from the image sensor 560 can be centered on a location corresponding to the user-selected image coordinates after registration. The rays can be intersected with the voxels. Candidate target points are indexes within intersected voxels. The size of $R_{CAND}$ can be determined based on the ground sampling distance of the registered image (as indicated by the registered image geometry metadata 108A) and the spacing of the points in the targetable 3D point set 104A so that the true target location lies somewhere in the cone.

FIG. 5C illustrates that the radius $R_{user}$ 567 is set to the user's ability to mensurate in the image (e.g., 0.5 pixels). Discrepancies are formed by projecting each point through the geometry and subtracting the projected image coordinate from the user-selected coordinate. Candidate points that have discrepancies within "$R_{user}$" pixel radius are kept as further filtered target candidates 568. A small discrepancy could arise at a point further down range. But this is not the target point, since it's occluded (up to $R_{user}$ "observability"). The "winner" target location is the point that passes the discrepancy test and that is closest to the sensor.

Still referring to FIG. 5C, FIG. 5C illustrates that there is now a smaller radius, and this smaller radius is used to measure the target in the image. The smaller radius might be a half a pixel, or it could be a pixel, depending upon how good the user is at clicking on the target in the two-dimensional image. This further limits the points 550 in FIG. 5B to a much smaller set of points, which in FIG. 5C are the points 568 and 569. That is, the points 568 and 569 are within the user's ability to select the location. Each one of the points 568 and 569 are projected to the image plane, and a delta is calculated in the image plane. This is referred to as a discrepancy. The smallest discrepancy is not necessarily the target location. As can be seen, there is a very small discrepancy in the point 568 that is the furthest from the sensor 560. However, that is not the target location. The target location is the one that is closest to the sensor, which is the point 569. So even though a point 568 may be closer to the ray 570 (meaning that when the point 568 is projected up, it might be closer to where the user picked the location) that is not the correct "winner" location, because the winner location has to be the location closest to the sensor.

The center sensor ray 570 in FIG. 5C is the user-selected point or position on the two-dimensional image, projected down to the ground. The largest discrepancy is the point furthest away from the center sensor ray. Similarly, the smallest discrepancy is the point closest to the center sensor ray. The winner has to be closer to the sensor 560 versus one that is more in line with the center ray 570 due to the following. In reality, the point 569 might occlude the user's view of the points 568 that have smaller discrepancies. That is why one picks a point that is closest to the sensor because there are no obstructing views. For example, and as noted previously, if the point 569 is on the roof of a building, and the points 568 that have smaller discrepancies are on the floor of the building, the true target location is going to be the roof, because the floor is not visible in the image and thus not observable by the user.

Considering now both FIGS. 1A and 5C together, FIG. 5C as noted illustrates how to transfer a user-selected image coordinate 110A to the targetable 3D point set 104A based on the candidate voxels and indexes. A narrower cone than the one illustrated in FIG, 5B is generated. The narrower cone has a restricted radius, $R_{USER}$, at the image plane that is set to the user's ability to mensurate in the image. Discrepancy values can be determined for each 3D point within the narrower cone. A discrepancy value can be determined by projecting each point in the narrower cone to the registered image geometry metadata 108A of the image 102A. The discrepancy value can then be determined as a difference between an image coordinate of the selected pixel coordinate 110A in the image 102A and an image coordinate of the projected 3D point from the targetable 3D point set 104A. The 3D point selected can be the one within the cone that is closest to the determined image sensor position in space.

The error estimates of operation 460 can include several factors, The error estimates can include one or more of an image mensuration error, an image-to-3D registration error, and a point transfer error. Other mensuration errors can also be included, In an embodiment, the errors include a 3×3 full error covariance on a ground surface. The error estimates can further include a $90^{th}$ percentile circular error (CE90) and a $90^{th}$ linear error (LE90). These error estimates are discussed in more detail in the following paragraphs.

In an embodiment, a total error in the system can be characterized by the following equation:

$$C_{total} = C_{GPM} + C_{user} + C_{reg} + C_{transfer} + C_{other,mens}$$
$$\phantom{C_{total} =} 3\times3 \quad 3\times3 \quad 3\times3 \quad 3\times3 \quad 3\times3 \quad 3\times3$$

In the above equation, $C_{GPM}$ refers to a generic point cloud model (GPM) error from the point cloud. This is the error associated with the points in the point cloud. The GPM error is specified and defined in a National Geospatial-Intelligence Agency (NGA) standard, which informs how to represent and compute that error data. The $C_{user}$ refers to a user image mensuration error, but characterized in ground space. This user error is associated with how well a user can actually point to a location in the two-dimensional image. The user error is normally in terms of pixel units. It is noted that the user pixel error has to be projected to the ground because a ground coordinate error is needed. The $C_{reg}$ refers to an image-to-3D registration error, another source of error when the two-dimensional image is registered to the 3-D GEOINT data. The registration is not going to be absolutely perfect, so the error must be accounted for. The $C_{transfer}$ refers to error from a point transfer algorithm. The ray intersection algorithm produces the point transfer error. And $C_{other,mens}$ refers to other potential mensuration errors, such as accommodating things like measuring the lengths of buildings in a new two-dimensional image. As noted in the above equation, each of the terms, in general, is a 3×3 full error covariance matrices on the ground. In the 3×3 full error covariance matrices, the three dimensions are the x, y, and z coordinates of latitude, longitude, and elevation. It is noted in connection with the error matrices that the error calculation is not just three numbers. It is a full three-dimensional covariance.

As noted, the user mensuration error is a function of how well the user can point to the target ($R_{user}$ radius 567 in FIG. 5C) in the two-dimensional image. As also noted, this error must be propagated to the ground. This propagation can be accomplished as follows. Referring to FIGS. 6A, 6B, 6C, and 6D, a ground coordinate frame (P) is constructed. As illustrated in FIG. 6A, this ground coordinate frame (P) 610 is perpendicular to the sensor line-of-sight (LOS). The ground sample distance of a pixel in the sample and line direction is computed in this frame. Then, the $R_{user}$ is propagated to the frame P, and the resulting covariance is propagated from frame P to the ground frame (G).

FIG. 6A illustrates the user-selected target location as the image plane 620. To determine the error on the ground, the perpendicular P-frame 610 is constructed. The error covariance associated with the user-selected location is referred to as the $R_{user}$ radius. The $R_{user}$ radius is projected down to the P-frame 610 based on the image sampling, which is referred to as the ground sampling distance (GSD) of the image. This illustrates that the ground sampling distance is taken into account when calculating the covariance on the ground associated with the user-selected location in the image, and that is based on the ground sampling distance in both the x and y directions on the ground. This process generates a covariance ellipsoid and equation as illustrated in FIG. 613. This transfers the radius associated with the user-selected target in the two-dimensional image space to the ground. It is scaled by the ground sampling distance in the line and sample directions, which is the gl and gs in FIG. 68. FIGS. 6B and 6C illustrate the covariance ellipsoid, and the resulting 3×3 error covariance matrix is illustrated in FIG. 6D. The ellipsoid is a visualization of the matrix.

In short, in FIGS. 6A, 68, 6C, and 6D, a Local-System Rectangular (LSR) frame L (630) is constructed as a tangent plane at the 3D target location. An LOS-perpendicular frame P is constructed at the 3D target location. The GSDs in the P-frame are computed, and the covariance in the P Frame is constructed.

The P-frame covariance is propagated to the ground via $$C_{user} = J_L^G J_P^L C_{user}^P [J_P^L]^T [J_L^G]^T$$

where $$J_P^L = \frac{\partial L}{\partial P} \text{ and } J_L^G = \frac{\partial G}{\partial L}$$

are Jacobians from P to LSR and LSR to "Ground". "Ground" in this context could be UTM map projection space (UTMx, UTMy, height above ellipsoid), or LSR space ("local" coordinate system constructed as a tangent plane to the WGS84 ellipsoid at the 3D target point). In the latter case the Jacobian $$J_L^G = \frac{\partial G}{\partial L}$$

is simply the identity.

More particularly, the just discussed P-frame and Jacobians illustrate propagation from a local frame to geodetic space. It is a classical error propagation approach using partial derivatives. In this process, the error has to be in latitude, longitude, and elevation, not in x, y, and z coordinates, in the local frame. These formulations move the process into the ground space. The J term refers to the Jacobians, and the partial derivative of L is taken with respect to P and the partial derivative of G is taken with respect to L. The L term refers to a local system and the G refers to a ground or geodetic system, which would include latitude, longitude, and elevation. The P is the frame in FIG. 6A. The LSR frame and the P frame are rotated with respect to one another, thereby moving from the frame 610 to the frame 630, which is ultimately where the process finishes.

More specifically, still referring to FIGS. 6A, 6B, 6C, and 6D, and further to FIG. 1A, these figures illustrate, by way of example, a conceptual diagram of how $C_{USER}$ can be determined. A ground coordinate frame (P) perpendicular to the sensor line-of-sight can be constructed. A ground sample distance (GSD) of a pixel in sample ($g_s$) and line ($g_l$) direction in this frame can be determined, such as based on registered image geometry metadata 108A. $R_{user}$ can be propagated to the P-frame. A covariance can be constructed in the P-frame as:

$$C_{USER}^P \begin{bmatrix} (R_{USER}g_s)^2 & 0 & 0 \\ 0 & (R_{USER}g_l)^2 & 0 \\ 0 & 0 & \sigma_z^2 \end{bmatrix}$$

The P-frame covariance can be propagated to the ground via $$C_{USER} = J_L^G J_P^L C_{USER}^P [J_P^L]^T [J_L^G]^t$$

The symbol $J_P^L = dL/dP$ is the error propagation Jacobians from system P to "Local System Rectangular", or LSR. The LSR frame is one that is constructed tangent to the surface of the earth. The quantity $J_L{}^G = dG/dL$ is the Jacobian from LSR to "Ground". Ground in this context can be a Universal Transverse Mercator (UTM) map projection space ($UTM_x$, $UTM_y$, height in the p-frame), or LSR space. In the latter case the Jacobian $J_L{}^G = dG/dL$ is simply the identity.

Regarding $C_{REG}$, registering the image 102A to the targetable 3D point set 104A can employ a photogrammetric resection process discussed below. If a ground control point (GCP) coordinate error covariance is set correctly, a posteriori errors of a registration adjustment provide the registration error covariance on the ground, $C_{REG}$. The GCP error that influences the registration covariance can be determined similar to $C_{USER}$, with $R_{USER}$ replaced with the one-sigma value for the image correlation process for the image 102A to 3D point set registration.

The Image-to-3D registration process employs a photogrammetric resection. If the GCP coordinate error covariance is set correctly, the posteriori errors of the adjustment provide the registration error covariance on the ground. As a result, the GCP error covariance is set very similar to the $C_{user}$ discussed above, but the $R_{user}$ radius is placed with the one-sigma value for the image correlation process for the two-dimensional to three-dimensional registration. The a priori GCPs are thus formed as:

$$C_{GCP,reg}^P = \begin{bmatrix} (\sigma_{corr}g_s)^2 & 0 & 0 \\ 0 & (\sigma_{corr}g_l)^2 & 0 \\ 0 & 0 & \sigma_z^2 \end{bmatrix}_{\sigma_z = "small"}$$

$\sigma_{corr}$=(sigma, corr) the standard error of the registration image correlation process.

Identical Jacobians to $C_{user}$ are employed to propagate from P-frame to G-frame.

The a priori covariance from the GCPs can thus be formed as $$C_{GCP,REG}^P = \begin{bmatrix} (\sigma_{CORR}g_s)^2 & 0 & 0 \\ 0 & (\sigma_{CORR}g_l)^2 & 0 \\ 0 & 0 & \sigma_z^2 \end{bmatrix}$$

Where $\sigma_{CORR}$ is the one-sigma value for tiepoint correlator accuracy (e.g., conservatively set to 0.5 pixels, but can be less or even set to one pixel or more if the registration process is not very accurate). Identical Jacobians to $C_{USER}$ can be employed to propagate the covariance from a P-frame to a G-frame.

Image to 3-D registration error is similar to the previously discussed error mensuration calculations. In the three-dimensional error calculation however, different types of error are being accommodated. Specifically, the error that is associated with the registration process itself. The $sigma_{corr}$ is the value of a tie point correlation process, that is, the registration process, The tie point correlation process is scaled by the ground sampling because the registration process produces errors in the image space. This is similar to the formula described above in connection with the user mensuration error. The difference is that the formula is now being used for the registration process rather than the user mensuration process.

Regarding $C_{TRANSFER}$, a technique for target transfer can generate a discrepancy vector in image space of the image 102A. This discrepancy vector can be the discrepancy of the point closest to the image sensor. A P-frame error covariance very similar to $C_{USER}$ can be determined but with $R_{USER}$ replaced with discrepancy vector values in the corresponding directions.

The target transfer error can thus be formed in the P-frame as $$C_{TRANSFER}^P \begin{bmatrix} (\delta_s g_s)^2 & 0 & 0 \\ 0 & (\delta_l g_l)^2 & 0 \\ 0 & 0 & \sigma_z^2 \end{bmatrix}$$

Where $\delta_s$, $\delta_l$ is the discrepancy vector in the sample and line directions of the image space of the transferred 3D target coordinate. Identical Jacobians to $C_{USER}$ can be employed to propagate from a P-frame to a G-frame.

Using $C_{OTHER}$, other system mensuration errors can also be accommodated. For example, if a new building is in the image 102A, but not in the targetable 3D point set 104A, one might measure the height of the building in the image 102A using a photogrammetric mensuration tool. The base of a structure (e.g., any object with a corresponding height in the image 102A, such as a flag pole, building, vehicle, appliance, statue, bridge, etc.) can be a first user-mensurated image point and a second user-mensurated image point at the top of the structure can be a second user-mensurated image point. The error covariance associated with the height can be an additional error source that is added as $C_{OTHER}$. In some cases, $C_{OTHER}$ is zero, such as in a normal single-point targeting scenario.

Figure 7:
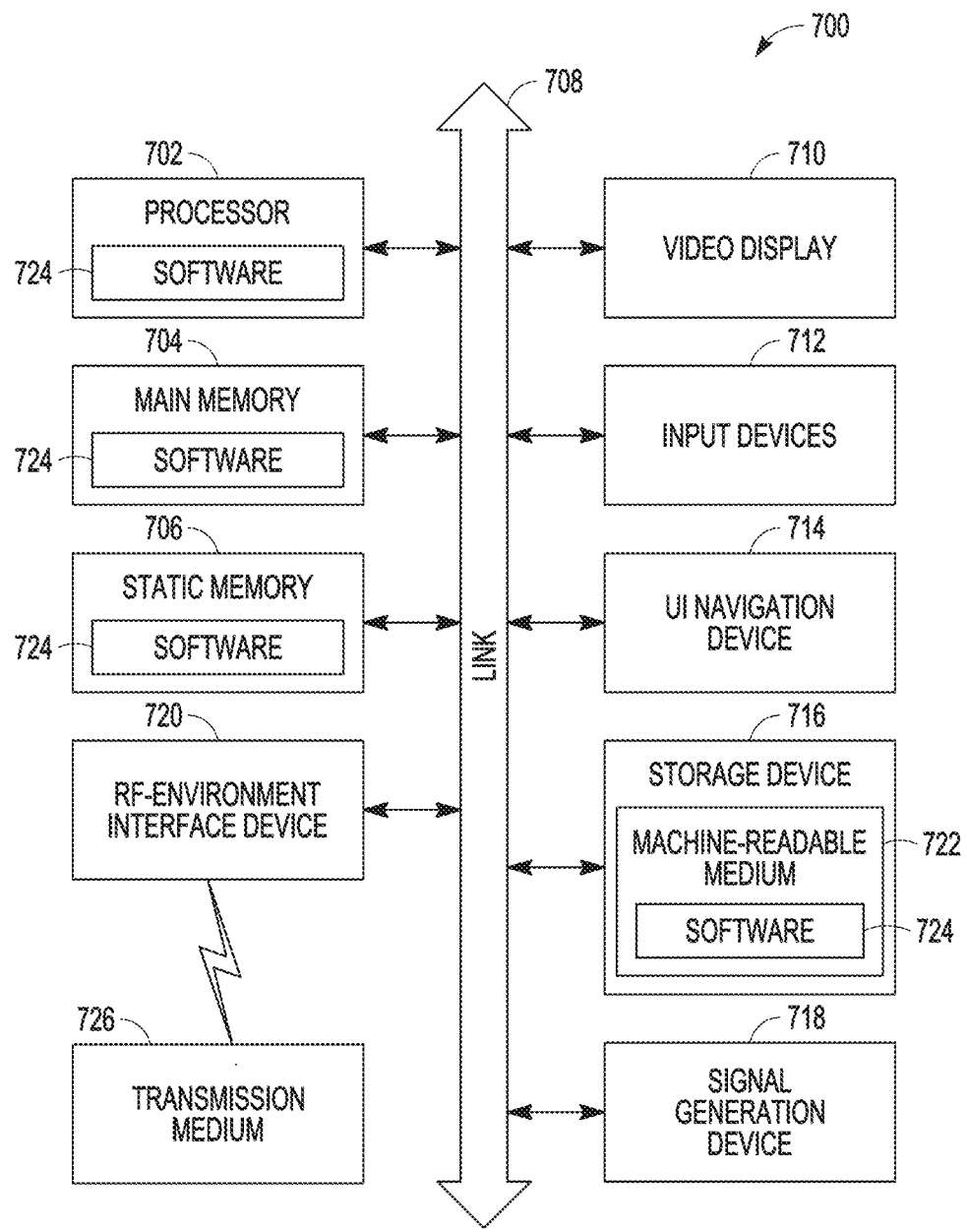
FIG. 7 is a diagram of a computer system upon which one or more embodiments of the present disclosure can execute.

FIG. 7 is a block diagram illustrating a computing and communications platform 700 in the example form of a general-purpose machine on which some or all the operations of this disclosure may be carried out according to various embodiments. In certain embodiments, programming of the computing platform 700 according to one or more particular algorithms produces a special-purpose machine upon execution of that programming. In a networked deployment, the computing platform 700 may operate in the capacity of either a server or a client machine in server-client network environments, or it may act as a peer machine in peer-to-peer (or distributed) network environments.

Example computing platform 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computing platform 700 may further include a video display unit 710, input devices 712 (e.g., a keyboard, camera, microphone), and a user interface (UI) navigation device 714 (e g mouse, touchscreen). The computing platform 700 may additionally include a storage device 716 (e.g., a drive unit), a signal generation device 718 a speaker), and a RF-environment interface device (RFEID) 720.

The storage device 716 includes a non-transitory machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computing platform 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not he limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM) and flash memory devices; magnetic disks such as internal hard disks and removable disks; magneto-optical disks; and CI)-ROM and DVD-ROM disks.

RFEID 720 includes radio receiver circuitry, along with analog-to-digital conversion circuitry, and interface circuitry to communicate via link 708 according to various embodiments. Various form factors are contemplated for RFEID 720. For instance, RFEID may be in the form of a wideband radio receiver, or scanning radio receiver, that interfaces with processor 702 via link 708. In one example, link 708 includes a PCI Express (PCIe) bus, including a slot into which the NIC form-factor may removably engage. In another embodiment, RFEID 720 includes circuitry laid out on a motherboard together with local link circuitry, processor interface circuitry, other input/output circuitry, memory circuitry, storage device and peripheral controller circuitry, and the like. In another embodiment, RFEID 720 is a peripheral that interfaces with link 708 via a peripheral input/output port such as a universal serial bus (USB) port. RFEID 1120 receives RF emissions over wireless transmission medium 726. RFEID 720 may be constructed to receive RADAR signaling, radio communications signaling, unintentional emissions, or some combination of such emissions.

Examples, as described herein, may include, or may operate on, logic or several components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part of or all operations described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

While examples herein refer to "targets" in 3D, in an embodiment the techniques herein may be employed not only for military, but also for commercial, civil or industrial applications. For example, determining 3D coordinates as describe herein can provide an automatic replacement for manual geodetic surveying of ground control points for use in photogrammetric processes. The techniques herein may also be employed for accurate map making based on newly acquired imagery over an industrial or urban region.

The invention claimed is:

1. A process comprising:
    receiving, into a computer processor, targetable three-dimensional data;
    receiving a two-dimensional image into the computer processor;
    registering the two-dimensional image to the targetable three-dimensional data including:
        forming a synthetic image by projecting the targetable three-dimensional data to geometry of the two-dimensional image;
        correlating the synthetic image and the two-dimensional image;
        identifying three-dimensional coordinates in the synthetic image as ground control points; and
        identifying observations for a ground control points bundle adjustment using the three-dimensional coordinates in the synthetic image, thereby generating a corrected geometry for the two-dimensional image and registering the two-dimensional image to the three-dimensional point cloud data;
    identifying image coordinates of a target within the registered two-dimensional image based on an input indicating selection of the target;
    intersecting the image coordinates of the target with the targetable three-dimensional data, thereby generating geodetic coordinates of the target in a point cloud;
    generating error estimates for the geodetic coordinates of the target; and
    storing in a computer database or displaying on a computer display device the geodetic coordinates of the target and associated error.

2. The process of claim 1, wherein the intersecting the image coordinates of the target with the targetable three-dimensional data comprises a ray intersection.

3. The process of claim 1, wherein generating the error estimates comprises determining one or more of an image mensuration error, an image-to-3D registration error, a point transfer error, and other mensuration errors.

4. The process of claim 3, wherein each of the errors comprises 3×3 full error covariance on a ground surface.

5. The process of claim 1 wherein the error estimates comprise one or more of a $90^{th}$ percentile circular error (CE90) and a $90^{th}$ percentile linear error (LE90).

6. The process of claim 1, wherein the intersecting of e image coordinates of the target with the targetable three-dimensional data comprises:
    generating a three-dimensional array comprising points in the point cloud, each of the points comprising an index into the point cloud;
    generating a cone of rays around the image coordinates of the target, the cone comprising a first candidate radius;
    intersecting compartments of the three-dimensional array using the cone, thereby determining candidate three-dimensional target points;
    projecting the candidate three-dimensional target points to the two-dimensional image;
    computing image discrepancies using the candidate three-dimensional target points;
    filtering the candidate three-dimensional target points using a second user radius; and
    selecting a candidate three-dimensional target point that is closest to a sensor that captured the two-dimensional image.

7. The process of claim 1, further comprising determining a location of the target using the geodetic coordinates and the error.

8. The process of claim 1, wherein the targetable three-dimensional data comprise three-dimensional geospatial intelligence (GEOINT) data.

9. The process of claim 1, further comprising controlling an asset such as a weapon or a sensor to take an action using the geodetic coordinates of the target and the associated error.

10. An apparatus comprising:
    a computer processor; and
    a computer database coupled to the computer processor;
    wherein the computer processor is operable for:
    receiving targetable three-dimensional data;
    receiving a two-dimensional image into the computer processor;
    registering the two-dimensional image to the targetable three-dimensional data including:
        forming a synthetic image by projecting the targetable three-dimensional data to geometry of the two-dimensional image:
        correlating the synthetic image and the two-dimensional image;
        identifying three-dimensional coordinates in the synthetic image as ground control points; and
        identifying observations for a ground control points bundle adjustment using the three-dimensional coordinates in the synthetic image, thereby generating a corrected geometry for the two-dimensional image and registering the two-dimensional image to the three-dimensional point cloud data;
    identifying image coordinates of a target within the registered two-dimensional image based on an input indicating selection of the target;
    intersecting the image coordinates of the target with the targetable three-dimensional data, thereby generating geodetic coordinates of the target in a point cloud;
    generating error estimates for the geodetic coordinates of the target; and
    storing in the computer database or displaying on a computer display device the geodetic coordinates of the target and associated error.

11. The apparatus of claim 10, wherein the intersecting the image coordinates of the target with the targetable three-dimensional data comprises a ray intersection.

12. The apparatus of claim 10, wherein generating the error estimates comprises determining one or more of an image mensuration error, an image-to-3D registration error, a point transfer error, and other mensuration errors; and wherein each of the errors comprises a 3×3 full error covariance on a ground surface.

13. The apparatus of claim 10, wherein the error estimates comprise one or more of a 90$^{th}$ percentile circular error (CE90) and a 90$^{th}$ percentile linear error (LE90).

14. The apparatus of claim 10, wherein the intersecting of the image coordinates of the target with the targetable three-dimensional data comprises:
   generating a three-dimensional array comprising points in the point cloud, each of the points comprising an index into the point cloud;
   generating a cone of rays around the image coordinates of the target, the cone comprising a first candidate radius;
   intersecting compartments of the three-dimensional array using the cone, thereby determining candidate three-dimensional target points;
   projecting the candidate three-dimensional target points to the two-dimensional image;
   computing image discrepancies using the candidate three-dimensional target points;
   filtering the candidate three-dimensional target points using a second user radius; and
   selecting a candidate three-dimensional target point that is closest to a sensor that captured the two-dimensional image.

15. The apparatus of claim 10, wherein the computer processor is operable for determining a location of the target using the geodetic coordinates and the error.

16. The apparatus of claim 10, wherein the targetable three-dimensional data. comprise three-dimensional geospatial intelligence (GEOINT) data.

17. The apparatus of claim 10, wherein the computer processor is operable for controlling an asset such as a weapon or a sensor to take an action using the geodetic coordinates of the target and the associated error.

18. A non-transitory machine-readable medium comprising instructions that when executed by a computer processor execute a process comprising:
   receiving targetable three-dimensional data;
   receiving a two-dimensional image into the computer processor;
   registering the two-dimensional image to the targetable three-dimensional data;
   identifying image coordinates of a target within the registered two-dimensional image based on an input indicating selection of the target;
   intersecting the image coordinates of the target with the targetable three-dimensional data, thereby generating geodetic coordinates of the target in a point cloud including:
      generating a three-dimensional array comprising points in the point cloud, each of the points comprising an index into the point cloud;
      generating a cone of rays around the image coordinates of the target, the cone comprising a first candidate radius;
      intersecting compartments of the three-dimensional array using the cone, thereby determining candidate three-dimensional target points;
      projecting the candidate three-dimensional target points to the two-dimensional image;
      computing image discrepancies using the candidate three-dimensional target points;
      filtering the candidate three-dimensional target points using a second user radius; and
      selecting a candidate three-dimensional target point that is closest to a sensor that captured the two-dimensional image;
   generating error estimates for the geodetic coordinates of the target; and
   storing in a computer database or displaying on a computer display device the geodetic coordinates of the target and associated error.

* * * * *